United States Patent
Aldrich et al.

(10) Patent No.: US 10,152,717 B1
(45) Date of Patent: *Dec. 11, 2018

(54) DOCUMENT PERFORMANCE BASED KNOWLEDGE CONTENT MANAGEMENT RECOMMENDER SYSTEM

(71) Applicant: Sprint Communications Company L.P., Overland Park, KS (US)

(72) Inventors: Dan Aldrich, Mission, KS (US); Mathew Henderson, Overland Park, KS (US); Judd Smith, Overland Park, KS (US); Ryan Studer, Lee's Summit, MO (US); Lance Williams, Leawood, KS (US); Chris Worley, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1520 days.

This patent is subject to a terminal disclaimer.

(21) Appl. No.: 13/902,426

(22) Filed: May 24, 2013

(51) Int. Cl.
*G06Q 30/00* (2012.01)
(52) U.S. Cl.
CPC .................................. *G06Q 30/016* (2013.01)
(58) Field of Classification Search
CPC combination set(s) only.
See application file for complete search history.

(56) References Cited

U.S. PATENT DOCUMENTS

| | | | |
|---|---|---|---|
| 7,826,597 B2 | 11/2010 | Berner et al. | |
| 8,724,795 B1 | 5/2014 | Aldrich et al. | |
| 2004/0042611 A1 | 3/2004 | Power et al. | |
| 2004/0102982 A1* | 5/2004 | Reid | G06Q 10/06393 |
| | | | 705/7.39 |
| 2007/0133780 A1 | 6/2007 | Berner et al. | |
| 2008/0118052 A1 | 5/2008 | Houmaidi et al. | |
| 2008/0172574 A1* | 7/2008 | Fisher | G06Q 10/06 |
| | | | 714/25 |
| 2008/0195659 A1 | 8/2008 | Rawle | |
| 2008/0195897 A1 | 8/2008 | Alainz et al. | |
| 2010/0077008 A1 | 3/2010 | Davis et al. | |

(Continued)

OTHER PUBLICATIONS

FAIPP Pre-Interview Communication dated Jan. 15, 2013, U.S. Appl. No. 13/043,636, filed Mar. 9, 2011.

(Continued)

*Primary Examiner* — Mark A Fleischer (57) ABSTRACT

Customer care representatives in the telecommunications industry and other service-based industries receive problem reports from customers associated with serviceIDs. These customer care representatives have access to at least one data store that contains pieces of content that may aid the customer care representative in assisting the customer. The pieces of content may be related to devices supported by the telecommunications service provider and services provided by or supported by the provider. The ability of the customer care representatives to assist customer is enhanced by returning a prioritized list of pieces of content where the priority is based on a content quality metric associated with some or all of the pieces of content. The content quality metric may be based on a plurality of factors that may each be normalized and weighted and, in some cases, combined, to determine a content quality metric that may be updated dynamically, periodically, or manually.

19 Claims, 7 Drawing Sheets

(56) References Cited

U.S. PATENT DOCUMENTS

2012/0303787 A1    11/2012  Fan et al.
2012/0321071 A1    12/2012  Fisher
2013/0054306 A1*   2/2013  Bhalla .................... G06Q 30/02
                                                                705/7.31
2013/0117267 A1*   5/2013  Buryak ............. G06F 17/30598
                                                                 707/737

OTHER PUBLICATIONS

Office Action dated Apr. 17, 2013, U.S. Appl. No. 13/043,636, filed Mar. 9, 2011.
Final Office Action dated Aug. 13, 2013, U.S. Appl. No. 13/043,636, filed Mar. 9, 2011.
Notice of Allowance dated Oct. 25, 2013, U.S. Appl. No. 13/043,636, filed Mar. 9, 2011.

* cited by examiner

DOCUMENT PERFORMANCE BASED KNOWLEDGE CONTENT MANAGEMENT RECOMMENDER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of portable electronic devices such as tablets, laptop computers, personal digital assistants (PDAs), as well as mobile phones and smart phones may encounter use and/or functionality issues with their devices or with the systems and services that both support and are accessed by those devices. In the event that a service or device problem arises, a user can contact and communicate with customer care regarding the problem experienced. During the course of this interaction, the customer care representative may troubleshoot the device or service directly or indirectly, depending on the type of problem reported and the available troubleshooting solutions.

SUMMARY

In an embodiment, a method of providing content to customer care comprising: receiving, by an application, during a first interaction between a user and a customer care representative, a report associated with at least one of a first service problem or a first device problem; receiving, by the application, a plurality of key words from the customer care representative, wherein at least some key words of the plurality of key words are associated with the report; and retrieving, by the application, a plurality of pieces of content associated with the at least some key words. The embodiment further comprising: sending, by the application, at least some pieces of content of the plurality of pieces of content to a graphical user interface of a device associated with the customer care representative; wherein each piece of the at least some pieces of content is associated with a content quality metric, and wherein the at least some of the pieces of content are sorted by the content quality metric associated with each piece of content. The embodiment further comprising: wherein the content quality metric is determined based on a plurality of call metrics wherein each call metric of the plurality of call metrics is associated with each piece of content; and wherein the plurality of call metrics comprises: an interaction time metric; a customer care representative sentiment metric; a next call metric; a content usage metric; and a content age metric; and updating, by the application, at least one call metric of the plurality of call metrics for at least one piece of content from the sorted list in response to the at least one piece of content being accessed from the sorted list.

In an alternate embodiment, a method of providing reliable content to customer care comprising: storing, on a server, a plurality of pieces of content, wherein each piece of content of the plurality of pieces of content is associated with at least one topic of a plurality of topics; and sending, by a server, in response to a request for content, at least some pieces of content of the plurality of pieces of content, wherein the request for content is associated with an interaction between a customer care representative and a customer. The embodiment further comprising: determining, by the server, a content quality metric associated with each piece of content, wherein the content quality metric comprises a plurality of call metrics; sorting, based on the content quality metric, the at least some of the pieces of content into a prioritized order, wherein the content quality metric is based on at least some of the plurality of call metrics associated with each piece of content, and wherein the plurality of call metrics comprise an average interaction time metric, a next call metric, a customer care representative sentiment metric, a content use metric, and a content age metric; and presenting the sorted pieces of content in the prioritized order.

In an alternate embodiment, a system for providing content to customer care comprising: a server and a data store coupled to a network, the data store comprising a plurality of pieces of content; and an application on the server. The embodiment further comprising: wherein the application: receives a plurality of key words from a search engine associated with at least one of a first service problem or a first device problem associated with a serviceID; sends at least some pieces of content of the plurality of pieces of content to a graphical user interface in a priority order, wherein the priority order is based on a content quality metric associated with the at least some pieces of content, wherein the content quality metric comprises at least two of: an average interaction time metric comprising an average of a plurality of interaction times associated with each piece of content; a customer care representative sentiment metric comprising one of an alpha, a numeric, or an alphanumeric code; a content usage metric comprising a number of times the content has been used during a plurality of interactions between a plurality of customer care representatives and a plurality of customers, wherein each customer of the plurality of customers is associated with at least one serviceID; and a content age metric comprising at least one of a length of time since the creation of each piece of content and a length of time since the last update to each piece of content; and determines if the serviceID associated with the first service problem or the first device problem is also associated with at least one of a second service problem or a second device problem.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Applicants incorporate by reference as appropriate to the disclosure herein U.S. patent application Ser. No. 13/043,636, Aldrich, et. al, "Problem Centric Knowledge Management Tool for Call Center." filed Mar. 9, 2011.

Customer care representatives, whether located at a call center or in a retail environment, may communicate troubleshooting, problem-solving information to customers. For example, customers of a telecommunications service provider may contact customer care regarding an issue with a service provided by the telecommunications service provider or a device supported by that provider. The customer care representatives may use a Boolean search system and enter key words based upon a phone conversation, a voice recording, or a writing in a live-chat or static (email, form, messaging) format, or combinations thereof which may be collectively referred to as a problem report. The problem report may detail a device or service problem experienced by a customer or other party associated with a unique serviceID. In an embodiment, a data store on a server, for example, a server of a telecommunications service provider, may store a plurality of pieces of troubleshooting and problem-solving content. The plurality of pieces of content may be generated by the telecommunications service provider, by third party partners, or by unaffiliated parties. The pieces of content may be accessed by an application to retrieve content related to a problem report based in part upon key words or phrases from the problem report or related to the problem report. The application may return some of the pieces of content to the customer care representative, to the customer, or to both depending upon the method of communication.

In an embodiment, a customer care representative who is in communication with a user by way of a voice-only connection may access the content and read the content to the user and/or troubleshoot the problem remotely based upon the content returned. In another example, a customer care representative may be in communication with a customer in person, on a text-chat client, or on a voice and video system wherein the customer care representative can show the content to the user and may also talk the user through at least one piece of content.

Conventionally, while some of the pieces of content returned to the customer care representative and/or the customer may be relevant to solving the problem at hand, and may even be ranked, there may not be an indication as to the quality of the piece of content. In an embodiment, the quality of the content may be represented by a content quality metric. The content quality metric may be determined by a plurality of call metrics that reflect the customer care and customer experience with the content, as well as the age and other factors that may influence the quality of a piece of content that provides troubleshooting and/or problem-solving information regarding telecommunications services and/or products. In an embodiment, the plurality of call metrics may include a customer care representative sentiment metric ("CCR sentiment"), an experience level of each of the customer care representatives using each piece of content metric ("CCR experience level"), an amount of time the piece of content is accessed during an interaction between a customer care representative, and a customer ("interaction time") which may also be referred to as the average handling time. The plurality of call metrics may further comprise a metric that indicates if the customer associated with a serviceID of a first report calls back within a certain time regarding another report ("next call"), as well as an age of the content ("content age"), and the frequency of the usage of the content ("content use").

In an embodiment, the content quality metric may be used as part of a system for providing content to customer care. A data store on a server on the network, the data store may comprise a plurality of pieces of content related to a plurality of services associated with a telecommunications network and a plurality of devices currently or previously supported on the telecommunications network. In one example, an application on a server, which may or may not be the same server on which the data store is located, receives a plurality of key words from a search engine. The plurality of key words may be taken from a first report of at least one of a service problem or a device problem, or may be based on that report. The first problem report may be associated with a serviceID. The application sends at least some pieces of content of the plurality of pieces of content to, for example, a graphical user interface on an electronic computing device on the network based on at least some of the key words. This graphical user interface may be the customer care representative's workstation or may be on the user's mobile phone or other portable electronic device, or a combination of both. In an embodiment, at least some pieces of content from the plurality of pieces of content on a server of the telecommunications provider or on a remote server of an affiliated or unaffiliated party are sent in a priority order based on a content quality metric associated with all or some of the pieces of content. In an embodiment, a piece of content retrieved from the server or servers, as discussed in detail below, may not have a content quality metric associated with it if the piece of content is too new or has just been modified.

In an embodiment, a customer provides a problem report to a customer care representative. The customer care representative could be located at a call center or in a retail location. The customer care representative may select a plurality of key words from and/or associated with the problem report. The application may retrieve a plurality of pieces of content from a data store that are associated with and/or based on at least some of the key words. The plurality of pieces of content in the data store may have been generated by the telecommunications service provider, device manufacturer, affiliated third parties, or unaffiliated third parties. In an embodiment, the application may be able to retrieve pieces of content from locations other than the data store, for example, from remote servers including a web server. Each piece of content retrieved may have an assigned content quality metric that is based on at least some of the plurality of call metrics, for example, a customer care representative sentiment metric, a customer care representative experience level metric, an interaction time (average handling time) metric, a next call metric, a content age metric, and a content use metric. In an embodiment, some or all of these metrics may be used to calculate the content quality metric for each piece of content. The pieces of content retrieved may originate from the telecommunications service provider, a partner of the provider, or an outside non-commissioned third party and may be stored in the data store on a server of the telecommunications service provider or on a remote server that may or may not be affiliated with the telecommunications service provider.

In an embodiment, each piece of content from the plurality of pieces of content pulled is ranked by the descending value of the content quality metric and sorted according to this ranking. This may be used to present the highest ranked content first which may help the customer care representative to resolve the customer's problem more quickly and efficiently. The content quality metric for each piece of content may be calculated on a dynamic, manual, or periodic basis. In some embodiments, prior to combining each call metric into the quality control metric, each metric may be normalized. In an embodiment, to promote normalization, each call metric may have a minimum and maximum value defined that is used in the normalization formula discussed below. It is appreciated that these values may be static or dynamic and may be derived from various statistical methods as appropriate. The call metrics may be determined in various ways depending on the call metric. For example, the interaction time metric (average handling time) may be based on an average time of a plurality of interactions between a plurality of customer care representatives and a plurality of customers associated with each piece of content. This metric may be calculated based on the amount of time each customer care representative who uses the associated piece of content spends using that piece of content while interacting with a customer. The interaction time may be measured, for example, over the lifetime of the piece of content or over a fixed period of time such as the time period since the content was first stored on the system, the time period since the content was last updated, or combinations thereof.

Figure 1:
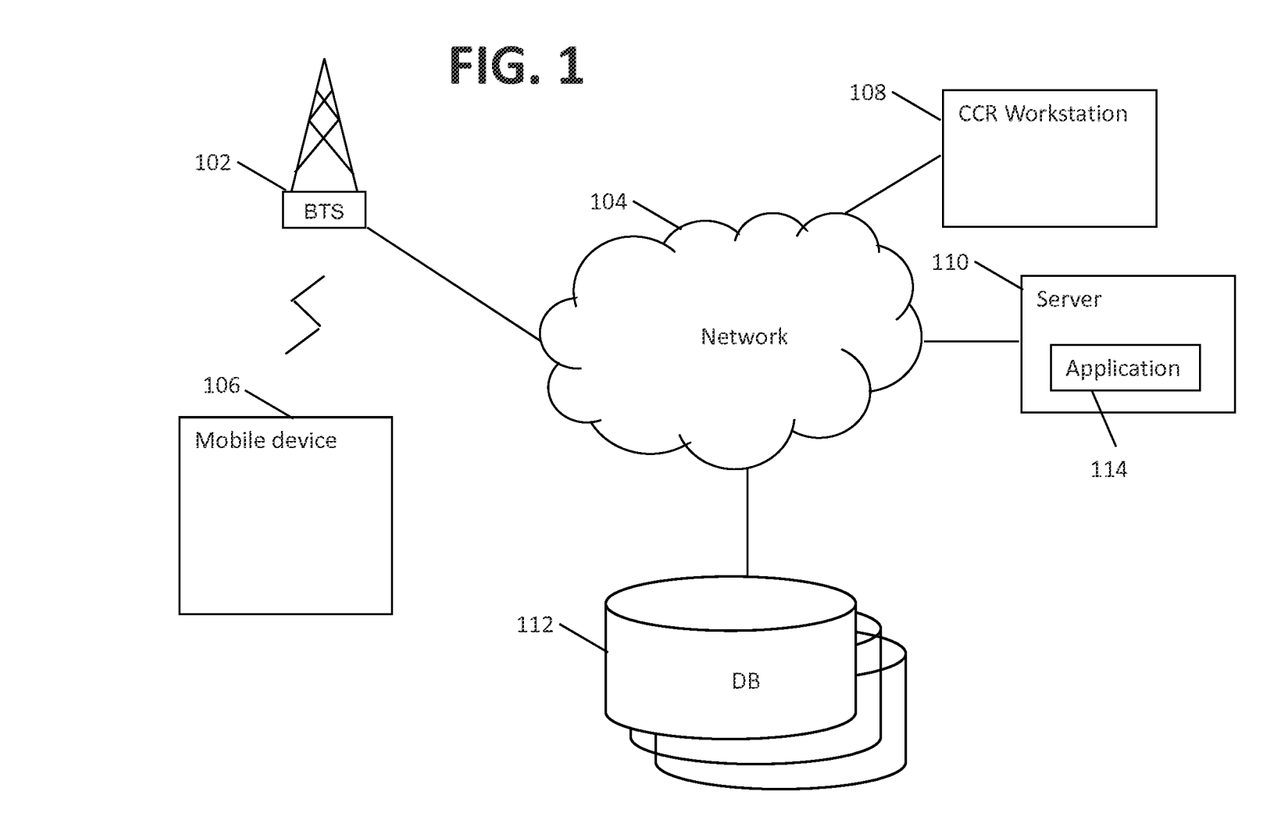
FIG. 1 is an illustration of a system for implementing methods according to embodiments of the disclosure.

FIG. 1 is an illustration of a system for implementing methods according to embodiments of the present disclosure. A base transceiver station 102 is in communication with a mobile device 106 and a network 104. The network 104 may be a network of a telecommunications service provider that provides support for services such as voice and data as well as device support to a plurality of private and corporate users of portable electronic devices. The network 104 may comprise one or more public communication networks, one or more private networks, and/or a combination thereof. In an embodiment, a serviceID is associated with each customer. This serviceID is a unique identifier that may be associated with one account or with a plurality of accounts, for example, for corporate users. The network 104 may also be in communication with a server computer 110 and a plurality of data stores 112 on the network 104. The server computer 110 may comprise an application 114 that is used by a plurality of customer care representatives to handle problem reports and other customer calls. The plurality of data stores 112 may comprise a plurality of pieces of content for troubleshooting hardware, software, and firmware problems as well as a plurality of information associated with previous reports for a plurality of serviceIDs. Since a telecommunications service provider may support a variety of devices, information for devices supported by the provider may be included in the plurality of pieces of content on the data stores 112. The plurality of pieces of content may be created by the telecommunications service provider, original equipment manufacturers (OEMs), by third parties affiliated with or commissioned by the telecommunications service provider, or may be provided by parties unaffiliated with the telecommunications service provider. In an embodiment, pieces of content may be accessed from a remote network (not pictured), that is, from a network other than the network 104.

In an embodiment, when a party associated with a serviceID contacts customer care, customer care receives the problem report, for example, using the interface of the customer care representative workstation 108 which is in communication with the network 104. A plurality of key words related to and/or associated with the problem report are received by the application 114 which retrieves a plurality of pieces of content from the data stores 112 based at least in part on the plurality of key words. As discussed below with respect to FIGS. 2 and 3, each piece of content, or each piece of content beyond a certain predetermined age or usage, may have a corresponding content quality metric. This content quality metric may be calculated based upon a number of individual metrics which may be collected as the content is introduced and which may be recalculated dynamically, manually, or at predetermined intervals of, for example, time, usage, rating, and when the content was last updated. The plurality of pieces of content retrieved by the application 114 may be sorted in a prioritized order based on the content quality metric for each piece of content. New content that may not yet have a content quality metric assigned may also be presented either at the bottom of the prioritized list or in a different list. This prioritized list allows the customer care representative to access the newest content as well as the content with the highest content quality metric. This may be useful, for example, if the problem report is in regards to a new or recently modified service or device where the pieces of content associated with the new or recently modified service or device may not have been accessed enough times and/or may not have been available long enough to have an associated content quality metric. By presenting these new pieces of content in a designated location on the prioritized list or in a separate list, the customer care representative is able to view these pieces of content. The calculation of the content quality metric is described in more detail below in FIG. 2.

The plurality of call metrics may comprise a variety of metrics as discussed above related to the use, effect, age, and user of each piece of content. In an embodiment, the customer care sentiment metric may be based on a rating provided by each customer care representative of a plurality of customer care representatives who have used the piece of content. The rating may comprise at least one of a number, letter, color code, or alphanumeric code, and may be input by each customer care representative subsequent to the customer care representative using the piece of content. In an embodiment, the customer care sentiment may reflect, in the same metric or a sub-metric or related separate metric, the sentiment regarding a piece of content that has recently been modified. In an embodiment, the customer care representatives may provide a narrative instead of or in addition to a rating. This narrative may be subsequently evaluated by a supervisor, peer, or text-analysis software to assign a rating.

In an embodiment, the next call metric may be based on how many serviceIDs associated with a first problem report also reported a second problem with a device or a service within a particular time period. In one embodiment, the next call metric may be indicated by a percentage, a total, or a normalized ranking indicator wherein the next call metric for each piece of content may be based on its metric relative to a next call metric of other pieces of content. In some embodiments, the next call metric may be based on a percentage of how many customers of a plurality of customers associated with each piece of content experienced at least one of another service problem or device problem within seven days of the first service problem or the first device problem. In an alternate embodiment, the next call metric may be based on a binary determination as to whether the serviceID associated with the first service problem or the first device problem is also associated with at least one of a second service problem or a second device problem received by the application. In some embodiments, determination may be based on whether the second problem report was received within a time period, for example, within seven days, of the first problem report associated with the first service problem or the first device problem.

In an embodiment, the content usage metric may be based on the number of times a piece of content has been used by a plurality of customer care representatives. This metric may be measured from at least one of a length of time since the creation of the piece of content and a length of time since the last update to the piece of content. In some embodiments, the content usage metric may be tied in to which customer care representative accessed a piece of content and/or the experience level of the customer care representative who accessed the piece of content. The content usage metric may be a number, a letter, or an alphanumeric combination that reflects the number of times the content has been accessed during its lifetime or during a specific period of time, for example, since an update or a change in the associated service or device. In another example, the content usage metric may reflect a range of number of uses within a time period or since an update or change in the associated service or device. For example, a piece of content used between 0-100 times during a period may receive an "A" or a "1" rating whereas a piece of content used 2000-5000 times during a period may receive a "D" or a "4" rating. If a piece of content is selected from a prioritized list, that selection may be tracked as content usage. In that example, the application discussed below may update at least one call metric of the plurality of call metrics, for example, content use, for at least one piece of content from the sorted list in response to the at least one piece of content being accessed from the sorted/prioritized list discussed below.

In an embodiment, the content quality metric associated with each piece of content may be updated one of dynamically, periodically, and manually. This type of updating may allow the customer care representative to locate the highest-quality content, taking into account new devices, new services, updates to devices and service, as well as new methods of problem resolution. In one example, if the update to the content quality metric is dynamic, the update may be in response to entry of new information regarding a piece of content, the entry of an amount of information associated with a piece of content that exceeds a pre-determined threshold. In another example, the content quality metric may be updated periodically at pre-determined times and/or after a predetermined number of times a piece of content is accessed, updated, or combinations thereof. In addition, the content quality metric may be updated manually by the system administrator, developer, or other party with the appropriate access or authorization. In some embodiments, a piece of content may be test-run to determine an initial content quality metric. A test-run may mean that the piece of content is used by a limited number of customer care representatives for a period of time or for a particular number of problem reports in order to determine its effectiveness and/or to calculate an initial content quality metric. If a piece of content has its content quality metric determined this way initially, it may be flagged or otherwise indicated as such to the customer care representative.

In an embodiment, at least some of the normalized call metrics are combined to form the content quality metric for each piece of content. The normalized call metrics, individually or in groups of two or more, may be weighted prior to calculating the content quality metric. In one example, the average interaction time metric may be weighted 20%, the next call metric may be weighted 40%, a combined customer care representative sentiment and content use metric may be weighted 25%, and the content age metric weighted 15%. In another example, each metric may be weighted equally. For example, in one embodiment, other metrics such as the customer care representative experience level may also be used in the calculation of the content quality metric. In an embodiment, each metric is normalized on a dynamic, periodic, or manual basis wherein normalization comprises taking the value of the metric as-calculated, whether by average, mean, or other statistical or mathematical process and using this formula:

Normalized value of metric=(Most recent value of metric−Minimum value of measurement parameter)/(maximum value of measurement parameter−minimum value of measurement parameter).

In an example, if the value of the customer care representative sentiment may range from 0-5 and the current metric value for a piece of content is 3.1, the normalized value would be:

(3.1−0)/(5−0)=0.62

Normalization brings the value of the metric into a range of 0-1. For metrics that may not be measured with numeric values, numeric values may be assigned by the algorithm to represent alpha values, color codes, or alpha-numeric values.

Figure 2:
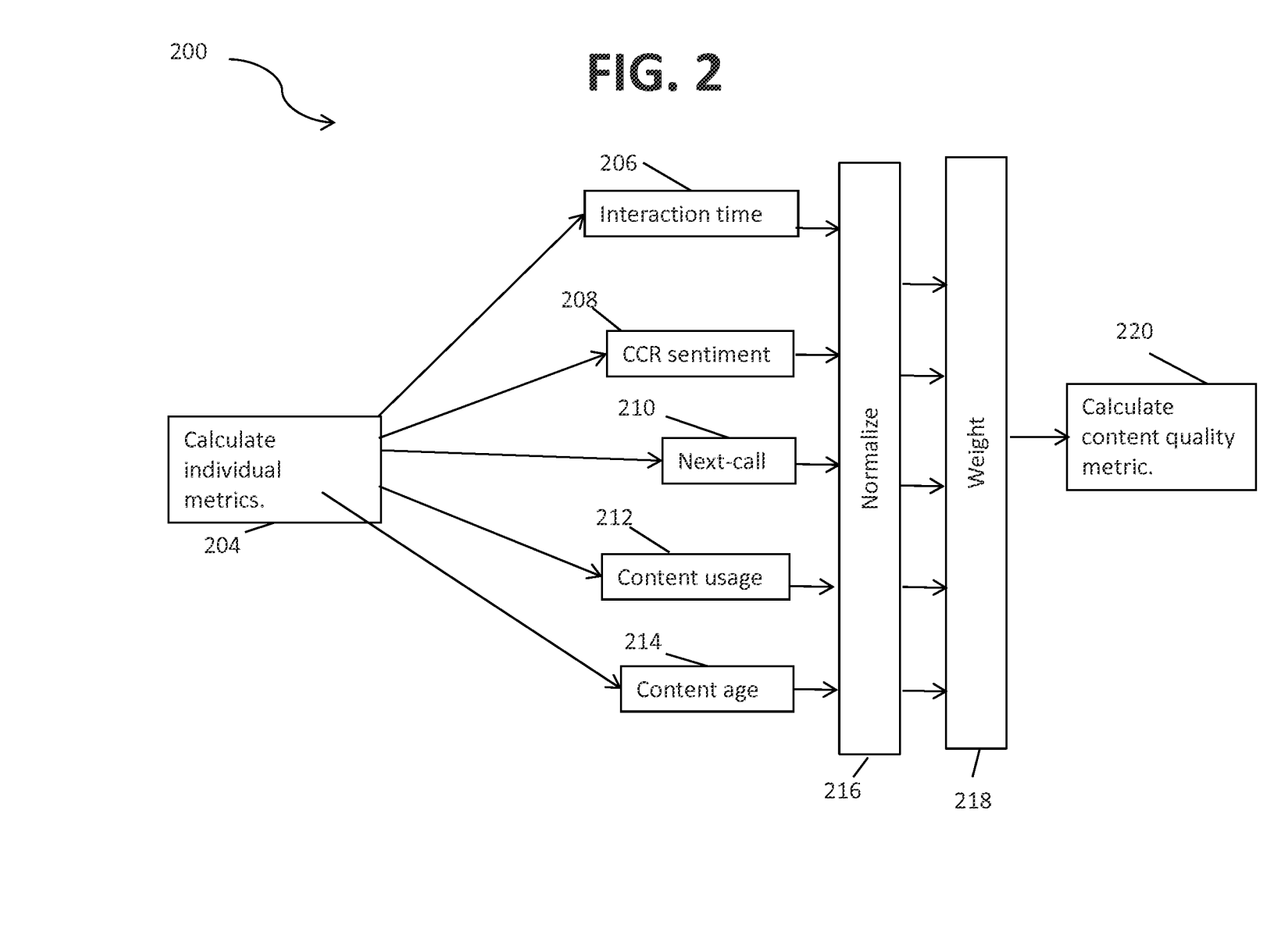
FIG. 2 is a flowchart of a method of calculating a content quality metric according to an embodiment of the disclosure.

FIG. 2 is a flowchart of a method of calculating a content quality metric according to an embodiment of the present disclosure. In method 200, a content quality metric is calculated for each piece of content of a plurality of pieces of content that meets at least one criteria as discussed above such as length of time in use, length of time since the last update or change in service or device, and number of uses. As discussed above in FIG. 1, the plurality of pieces of content may be stored on a server on a telecommunications service provider's network or may be stored on remote servers of third party affiliates/partners of the telecommunications service provider or unrelated parties. In some embodiments, the content quality metric may be calculated for the first time after the content reaches a certain number of uses by a plurality of customer care representatives, after a certain time since the piece of content was made available to the plurality of customer care representatives, or a combination of factors. In another embodiment, the content quality metric may be recalculated dynamically, manually, at pre-determined intervals based on time, usage, updates, ratings, or a combination of factors.

At block 204, a plurality of individual metrics may be calculated for each piece of content. The plurality of call metrics may comprise an interaction time calculated at block 206, a CCR sentiment calculated at block 208, a next-call metric calculated at block 210, a content usage metric at block 212, and a content age metric at block 214. The interaction time may be calculated at block 206 using an average of the time each of a plurality of customer care representatives spend accessing each piece of content. This metric may comprise the interaction time, or average call handling time, of a plurality of customer care representatives. In an embodiment (not pictured), the experience of the customer care representatives may be a separate metric or may be used in the calculation of the interaction time metric. The interaction time may be calculated at block 206 over the entire life of the piece of content or for a predetermined interval of time, or from a point where the piece of content was edited forward, and may be calculated as an average, a mean, or another statistical metric as appropriate. At block 208 the CCR sentiment is received and calculated for the piece of content. The CCR sentiment may be received by the application as a number, letter, alphanumeric, key word, or color code and may be converted to a value that can be normalized at block 216 as discussed below. At block 210, the next-call metric is calculated. This call metric indicates whether a serviceID associated with a first problem report, as discussed in detail in FIGS. 1 and 3, reports a second problem. In some embodiments, the second problem report is only counted towards this metric if it is received within a pre-determined time period of the first problem report. This indication may be a binary indication, or it may be a stepped indication wherein a plurality of pre-determined time periods are defined and one identifier is used to indicate a second problem report within, for example, 7 days. In that example, a second identifier is used to indicate a second problem report within, for example, 3 days, and a third indicator used to indicate a second problem report during a period longer than 7 days.

At block 212 the content usage metric is calculated. This calculation may be based on the number of times the piece of content is accessed, the number of times the content is accessed in a predetermined time period, the number of times the content is accessed since a change to the content, the number of times the content is accessed by a particular customer care agent or a plurality of customer care agents based upon the experience level of those agents, or combinations thereof. At block 214 a content age may be determined for the piece of content. The content age may be the age of the content since its creation and/or introduction to the system, since a modification of the piece of content, since an introduction or modification of a system or device associated with that piece of content, or combinations thereof.

At block 216, each metric calculated at blocks 206-214 may be normalized. To normalize each metric, the type of data entered, if not numeric, is transformed to a value that can be normalized, for example, Normalized value of metric=Nv;
Most recent value of metric=Mrv;
Minimum value of measurement parameter=min;
Maximum value of measurement parameter=max;

$$Nv=(Mrv-\min)/(\max-\min).$$

Once each metric that is to be used to calculate the content quality metric at block 220 is normalized, each metric, and/or each combination of metrics, may be weighted at block 218 prior to the calculation of the content quality metric at block 220. The method 200 may be repeated for each piece of content used by a plurality of customer care representatives. In some embodiments, each metric may be weighted equally and every metric, including additional metrics not mentioned herein, may be used to calculate the content quality metric for each piece of content. In alternate embodiments, each metric may not be weighted equally and some metrics may be combined prior to weighting. In a preferred embodiment, the average interaction time metric is weighted 20%, the next call metric is weighted 40%, the content age metric is weighted 15%, the customer care representative sentiment metric is combined with the content use metric to form a combined metric, and the combined metric is weighted 25%. In an embodiment, the system may determine at least one outlier which could be a high value or a low value of one or more metrics, and the at least one outlier call metric may be removed from normalization process and/or flagged for review for an administrator or other authorized party. The at least one outlier call metric may be determined by statistical methodology such as 6-sigma, by an algorithm of the system, or by using other commercially available statistical packages. The at least one outlier call metric may be determined as a predefined number of standard deviations off of a median value for the subject call metric, for example 2 standard deviations above or below the median value of a population of observed call metric values, 3 standard deviations above or below the median value, or some other predefined number of standard deviations. In an embodiment, outliers may be identified and excluded from calculations of norms because they are deemed to deviate markedly from the population metrics as a whole and may consequently distort the norm undesirably if used in calculating the norm. In combination with the present disclosure, one skilled in the art will be able to identify and exclude outlier metric values.

Figure 3:
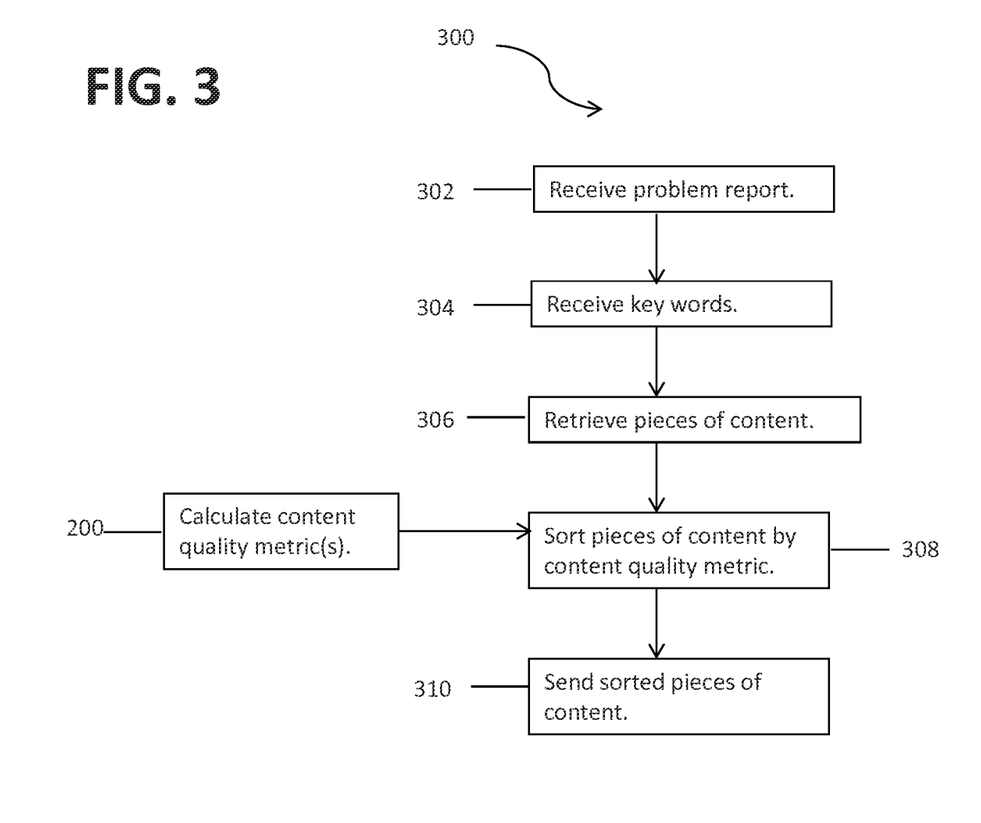
FIG. 3 is a flow chart of a method of retrieving sorted pieces of content from a plurality of pieces of content according to embodiments of the disclosure.

FIG. 3 is a flow chart of a method of retrieving prioritized pieces of content from a plurality of pieces of content. Method 300 comprises block 302 where an application receives a problem report based on a first interaction between a customer care representative and a customer associated with a serviceID. The problem report may involve a device or a service supported by a telecommunications service provider. At block 304, the application receives a plurality of key words from at least one of the customer care representative and the customer. At block 306, the application retrieves a plurality of pieces of content from at least one of a data store on the telecommunications provider's network, a data store on a remote network, and a data store on the network of a third party affiliated with the telecommunications provider. Each piece of content retrieved may have an associated content quality metric calculated using method 200 as discussed in FIG. 2. The pieces of content retrieved at block 306 may be sorted at block 308 by the content quality metric into a prioritized list. In an alternate embodiment, each piece of content retrieved at block 306 may be sorted by one or more of the individual metrics discussed in FIG. 2. The prioritized list may show the content quality metric for each piece of content as well as some or all of the metrics used to calculate the content quality metric. At block 310, the sorted prioritized pieces of content may be sent by the application to at least one of the customer or the customer care representative depending upon the method of interaction. For example, if the customer care representative and the customer are interacting by messaging, the prioritized content may be presented to both parties. If the interaction is by email or phone, the prioritized content may be presented to the customer care representative and may be presented at a later time to the customer, for example, by email or text message. In an embodiment, the application updates at least one call metric of the plurality of call metrics for at least one piece of content from the prioritized list in response to the at least one piece of content being accessed from the prioritized list.

Figure 4:
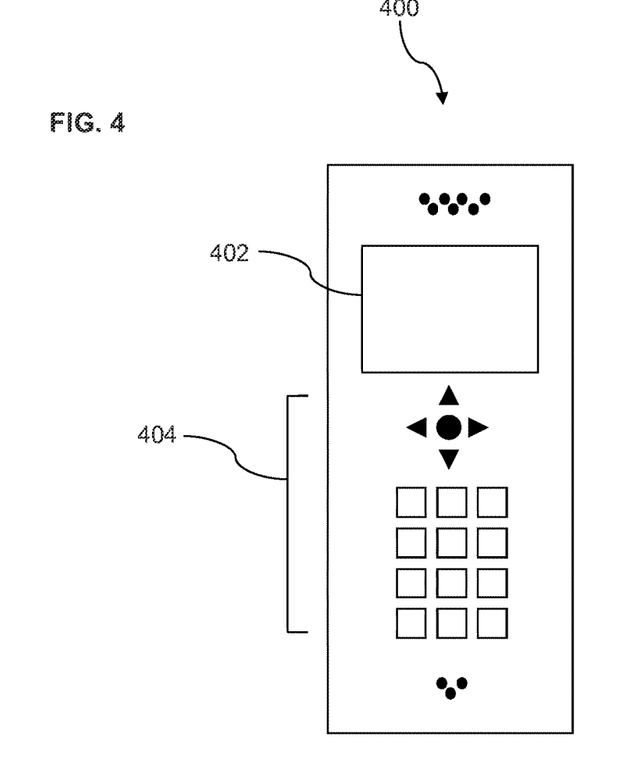
FIG. 4 depicts a mobile device operable for implementing aspects of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
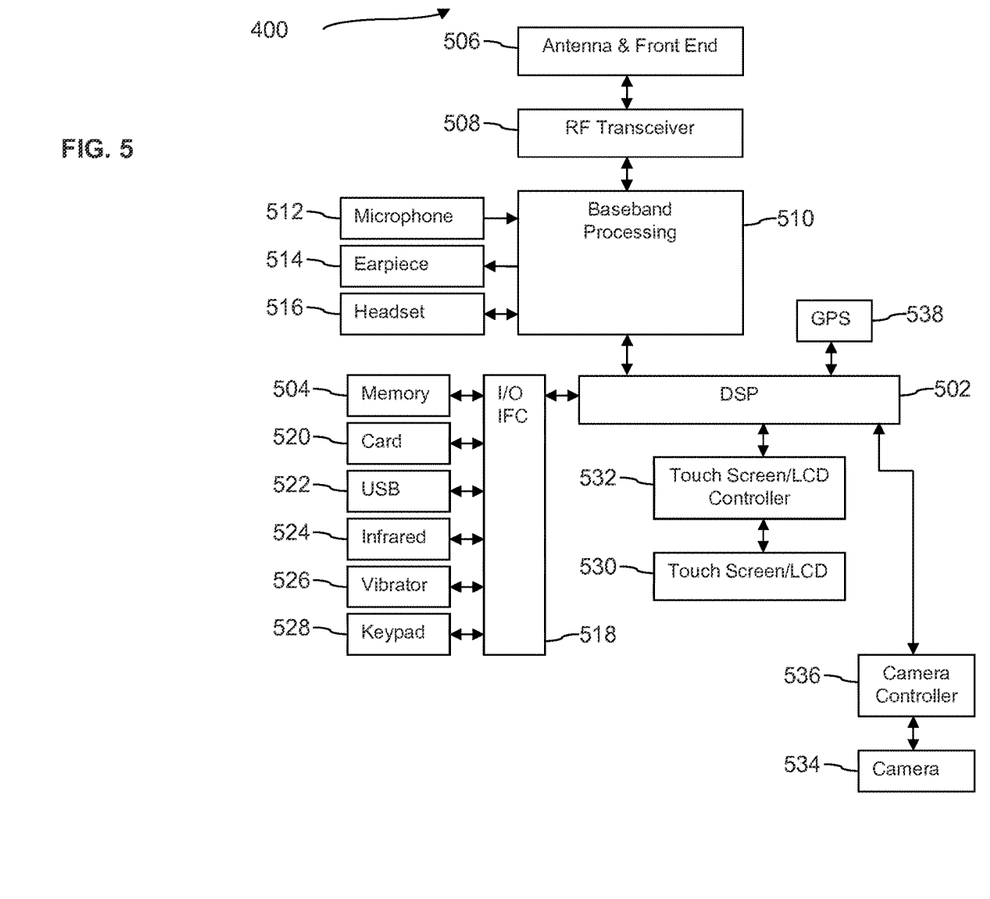
FIG. 5 shows a block diagram of a mobile device suitable for implementing embodiments of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
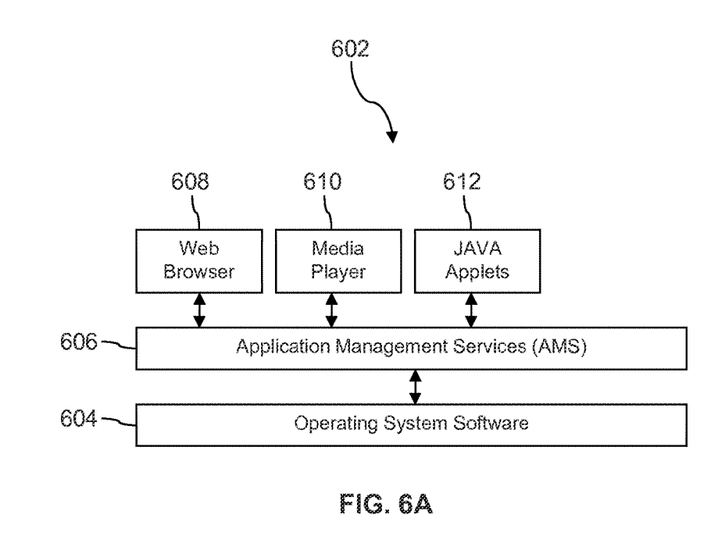
FIG. 6A illustrates a software environment suitable for implementing embodiments of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
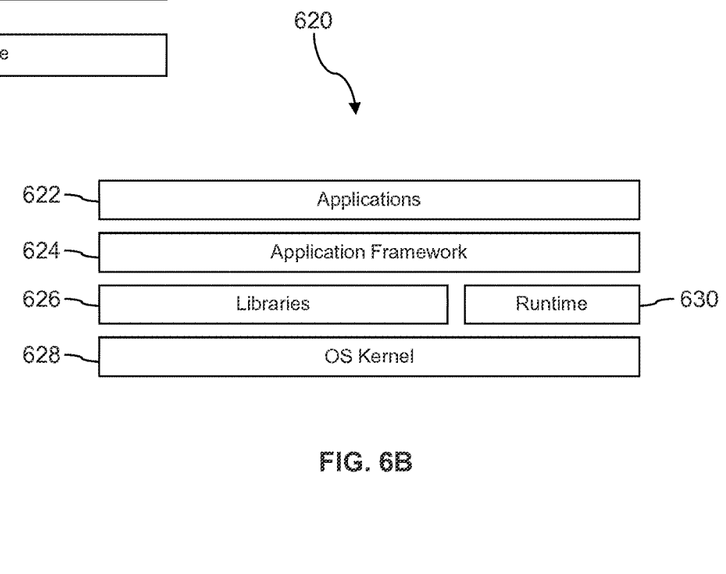
FIG. 6B illustrates an alternative software environment suitable for implementing embodiments of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
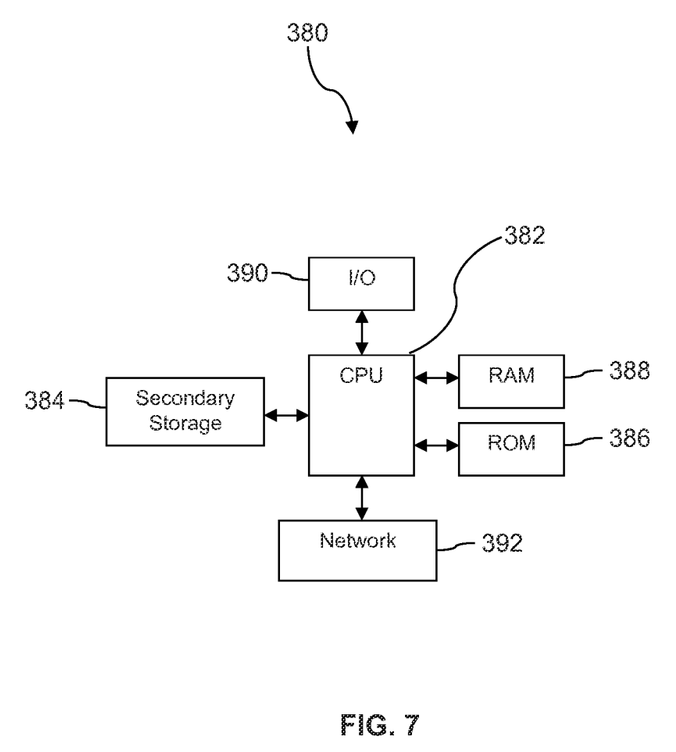
FIG. 7 illustrates a computer system suitable for implementing one or more embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing content to a customer care representative, comprising:
   receiving, by an application, during a first interaction between a user and the customer care representative, a report associated with at least one of a first service problem or a first device problem;
   receiving, by the application, a plurality of key words from the customer care representative, wherein at least some key words of the plurality of key words are associated with the report;
   retrieving, by the application, a plurality of pieces of content associated with the at least some key words, the plurality of pieces of content including customer support documentation at least partially related to the first service problem or the first device problem;
   sending, by the application, at least some pieces of content of the plurality of pieces of content to a graphical user interface of a device associated with the customer care representative, the at least some pieces of content of the plurality of pieces of content displayed in a first sorted list;
   wherein each piece of the at least some pieces of content is associated with a content quality metric indicating a quality of each respective piece of the at least some pieces of content with respect to the first service problem or the first device problem in resolving the first service problem or the first device problem,
   wherein the at least some of the pieces of content are sorted in the first sorted list by the content quality metric associated with each piece of content;
   wherein the content quality metric is determined based on a plurality of call metrics, wherein each call metric of the plurality of call metrics is associated with each piece of content; and
   wherein the plurality of call metrics comprises:
   an interaction time metric indicating an average time of a plurality of interactions between a plurality of customer care representatives and a plurality of customers associated with each piece of content;
   a customer care representative sentiment metric indicating an average value of a rating provided by each customer care representative of a plurality of customer care representatives for each piece of content;
   a next call metric indicating an additional interaction with the user;
   a content usage metric indicating an amount of time that a respective piece of the at least some pieces of content is accessed in addressing the first service problem or the first device problem; and
   a content age metric indicating an age of a respective piece of the at least some pieces of content;
   updating, by the application, at least one call metric of the plurality of call metrics for at least one piece of content from the first sorted list in response to the at least one piece of content being accessed from the first sorted list; and
   sending, by the application, the at least some pieces of content of the plurality of pieces of content to the graphical user interface of the device associated with the customer care representative, the at least some pieces of content of the plurality of pieces of content displayed in a second sorted list varied from the first sorted list based on the updated at least one call metric of the plurality of call metrics.

2. The method of claim 1, wherein the content quality metric associated with each piece of content of the at least some pieces of content is determined based on weighting at least some of the metrics of the plurality of call metrics.

3. The method of claim 2, further comprising normalizing, prior to weighting, each call metric of the plurality of call metrics.

4. The method of claim 3, further comprising determining, prior to normalizing, at least one outlier call metric and removing, in response to the determination, the at least one outlier call metric prior to normalizing each call metric.

5. The method of claim 1, wherein the next call metric is based on a percentage of how many customers of a plurality of customers associated with each piece of content experienced at least one of another service problem or device problem.

6. The method of claim 5, wherein the next call metric further is based on a percentage of how many customers of a plurality of customers associated with each piece of content experienced at least one of another service problem or device problem within seven days of the first service problem or the first device problem.

7. The method of claim 1, wherein the content usage metric is based on the number of times the content has been used by a plurality of customer care representatives, and wherein the content age metric comprises at least one of a length of time since the creation of each piece of content or a length of time since the last update to each piece of content.

8. The method of claim 1, wherein the next call metric is based on a binary determination as to whether the serviceID associated with the first service problem or the first device problem is also associated with at least one of a second service problem or a second device problem received by the application within seven days of the first service problem or the first device problem.

9. A method of providing reliable content to a customer care representative, comprising:
    storing, on a server, a plurality of pieces of content, wherein each piece of content of the plurality of pieces of content is associated with at least one topic of a plurality of topics;
    sending, by a server, in response to a request for content, at least some pieces of content of the plurality of pieces of content, wherein the request for content is associated with an interaction between the customer care representative and a customer;
    determining, by the server, a content quality metric indicating a quality of each respective piece of content and associated with each piece of content, wherein the content quality metric comprises a plurality of call metrics that comprise:
        an interaction time metric indicating an average time of a plurality of interactions between a plurality of customer care representatives and a plurality of customers associated with each piece of content;
        a customer care representative sentiment metric indicating an average value of a rating provided by each customer care representative of a plurality of customer care representatives for each piece of content;
        a next call metric indicating an additional interaction with the user relating to a same problem;
        a content usage metric indicating an amount of time that a respective piece of the plurality of pieces of content is accessed in addressing a first problem; and
        a content age metric indicating an age of a respective piece of content of the plurality of pieces of content;
    sorting, based on the content quality metric, the at least some of the pieces of content into a prioritized order, wherein the content quality metric is based on at least some of the plurality of call metrics associated with each piece of content, and wherein the plurality of call metrics comprise an average interaction time metric, a next call metric, a customer care representative sentiment metric, a content use metric, and a content age metric;
    presenting the sorted pieces of content in the prioritized order;
    determining, by the server, an updated content quality metric associated with each piece of content, wherein the updated content quality metric comprises an updated plurality of call metrics;
    sorting, based on the updated content quality metric, the at least some of the pieces of content into an updated prioritized order, wherein the updated content quality metric is based on at least some of the updated plurality of call metrics associated with each piece of content, and wherein the updated plurality of call metrics comprise an updated average interaction time metric, an updated next call metric, an updated customer care representative sentiment metric, an updated content use metric, and an updated content age metric; and
    presenting the sorted pieces of content in the updated prioritized order.

10. The method of claim 9, wherein the content quality metric associated with each piece of content of the at least some pieces of content is updated one of dynamically, periodically, and manually to form the updated content quality metric.

11. The method of claim 9, wherein the plurality of call metrics further comprises a customer care representative experience metric.

12. The method of claim 9, wherein each call metric is normalized and weighted prior to determining the content quality metric.

13. The method of claim 12, further comprising combining the customer care representative sentiment metric and the content use metric to form a combined metric.

14. The method of claim 13, wherein the combined metric is weighted 25%.

15. The method of claim 9, wherein each topic of the plurality of topics is associated with at least one of a telecommunications service or a telecommunications device.

16. The method of claim 15, wherein the average interaction time metric is weighted 20%, and the next call metric is weighted 40%.

17. A system for providing content to a customer care representative, comprising:
    a server and a data store coupled to a network, the data store comprising a plurality of pieces of content; and
    an application on the server, wherein the application:
        receives a plurality of key words from a search engine associated with at least one of a first service problem or a first device problem associated with a serviceID;
        sends at least some pieces of content of the plurality of pieces of content to a graphical user interface as a prioritized list, wherein the prioritized list is based on a content quality metric associated with the at least some pieces of content, wherein the content quality metric comprises at least two of:
- an average interaction time metric comprising an average of a plurality of interaction times associated with each piece of content;
- a customer care representative sentiment metric comprising one of an alpha, a numeric, or an alphanumeric code;
- a content usage metric comprising a number of times the content has been used during a plurality of interactions between a plurality of customer care representatives and a plurality of customers, wherein each customer of the plurality of customers is associated with at least one serviceID;
- a content age metric comprising at least one of a length of time since the creation of each piece of content and a length of time since the last update to each piece of content;

determines if the serviceID associated with the first service problem or the first device problem is also associated with at least one of a second service problem or a second device problem; and updates the prioritized list based on a change to the content quality metric to increase priority of at least one piece of content of the plurality of pieces of content when the change to the content quality metric is an increase in content quality and to decrease priority of at least one piece of content of the plurality of pieces of content when the change to the content quality metric is a decrease in content quality.

18. The system of claim 17, wherein the second service problem or a second device problem is received within seven days of the first service problem or the first device problem.

19. The system of claim 17, further comprising a customer care representative workstation, wherein the prioritized list is sent to a graphical user interface of the customer care workstation.

* * * * *